(12) United States Patent
Han et al.

(10) Patent No.: US 12,195,135 B2
(45) Date of Patent: Jan. 14, 2025

(54) CRANK VARIABLE-SPEED GEAR DEVICE FOR INCREASING ROTATIONAL POWER

(71) Applicants: SPEEDTECH CO., LTD., Dongducheon-si (KR); Jang Young Han, Busan (KR)

(72) Inventors: Jang Young Han, Busan (KR); Dal Won Seo, Siheung-si (KR)

(73) Assignees: SPEEDTECH CO., LTD., Dongducheon-si (KR); Jan Young Han, Busan (KR)

( * ) Notice: Subject to any disclaimer, the term of this patent is extended or adjusted under 35 U.S.C. 154(b) by 734 days.

(21) Appl. No.: 17/296,537

(22) PCT Filed: Nov. 8, 2019

(86) PCT No.: PCT/KR2019/015180
§ 371 (c)(1),
(2) Date: May 24, 2021

(87) PCT Pub. No.: WO2020/111569
PCT Pub. Date: Jun. 4, 2020

(65) Prior Publication Data
US 2022/0024540 A1     Jan. 27, 2022

(30) Foreign Application Priority Data

Nov. 26, 2018 (KR) .......... 10-2018-0147326

(51) Int. Cl.
*B62M 11/14*     (2006.01)
*B62M 1/36*      (2013.01)
(Continued)

(52) U.S. Cl.
CPC ............ *B62M 11/145* (2013.01); *B62M 1/36* (2013.01); *B62M 3/00* (2013.01); *B62M 11/18* (2013.01)

(58) Field of Classification Search
CPC ..... B62M 11/14; B62M 11/145; B62M 11/18; B62M 3/00
(Continued)

(56) References Cited

U.S. PATENT DOCUMENTS 5,788,593 A * 8/1998 Tiong ................. B62M 9/10
                                                474/160
6,419,252 B1   7/2002 Park et al.
(Continued)

FOREIGN PATENT DOCUMENTS

CN   101284561 A   10/2008
CN   105722754 A   6/2016
(Continued)

OTHER PUBLICATIONS

WO-2015056832-A1 Translation (Year: 2015).*
International Search Report for PCT/KR2019/015180 mailed Feb. 21, 2020 from Korean Intellectual Property Office.

*Primary Examiner* — Christopher B Wehrly
(74) *Attorney, Agent, or Firm* — Revolution IP, PLLC (57) ABSTRACT

Disclosed is a crank variable-speed gear device (100) wherein the gear ratio can be increased to 1.6:1 to 1.8:1 through a gear assembly and a latch assembly, and the gear ratio can also be changed to 1:1, if necessary, thereby providing an excellent transmission efficiency, facilitating the manipulation thereof, and making it possible to provide a compact and lightweight bicycle.

4 Claims, 7 Drawing Sheets

(51) Int. Cl.
*B62M 3/00* (2006.01)
*B62M 11/18* (2006.01)

(58) Field of Classification Search
USPC .......................................... 280/260; 475/269
See application file for complete search history.

(56) References Cited

U.S. PATENT DOCUMENTS

| | | | |
|---|---|---|---|
| 2008/0252037 A1 | 10/2008 | Wesling et al. | |
| 2008/0254929 A1* | 10/2008 | Wesling | B62M 11/145 |
| | | | 475/182 |
| 2011/0251008 A1 | 10/2011 | Schmitz et al. | |
| 2012/0028751 A1* | 2/2012 | Serkh | B62K 23/04 |
| | | | 475/269 |
| 2018/0045279 A1 | 2/2018 | Park et al. | |

FOREIGN PATENT DOCUMENTS

| | | | |
|---|---|---|---|
| CN | 107250605 A | 10/2017 | |
| EP | 0865375 A1 | 9/1998 | |
| EP | 1980484 A1 | 10/2008 | |
| EP | 2773554 A1 | 9/2014 | |
| KR | 10-1999-0077750 A | 10/1999 | |
| KR | 10-0921178 B1 | 10/2009 | |
| KR | 10-2011-0094473 A | 8/2011 | |
| KR | 10-1089683 B1 | 12/2011 | |
| KR | 10-1468389 B1 | 12/2014 | |
| KR | 10-1749896 B1 | 6/2017 | |
| WO | 9946159 A1 | 9/1999 | |
| WO | WO-2015056832 A1 * | 4/2015 | .......... B62M 11/145 |

\* cited by examiner

ent invention to provide a crank variable-speed gear device which has excellent gear ratio increase and change effects and a simple power transmission structure, is conveniently manipulated, and provides a compact and lightweight bicycle.

CRANK VARIABLE-SPEED GEAR DEVICE FOR INCREASING ROTATIONAL POWER

TECHNICAL FIELD

The present invention relates to a crank variable-speed gear device for increasing rotational power, and more particularly to a crank variable-speed gear device which may increase a gear ratio to 1.6:1 to 1.8:1 through a gear assembly and a latch assembly and also change the gear ratio to 1:1, if necessary, so as to achieve excellent transmission efficiency, to facilitate manipulation of the crank variable-speed gear device and to provide a compact and lightweight bicycle.

BACKGROUND ART

In general, a bicycle is driven based on a driving principle in which pressing force by a human is transmitted to a rear wheel via pedals, a crank mechanism and a chain. Recently, a bicycle in which a gear ratio is changed depending on the driving speed and state of the bicycle so that the bicycle may more effectively travel is being generalized.

In order to improve the rotational power of the bicycle to improve the driving speed of the bicycle, a power transmission device, in which a sprocket formed at one side of a crank shaft of the bicycle or a sprocket formed at a rear wheel is provided as a multi-stage sprocket set including a plurality of sprockets having different diameters so as to change the position of a chain corresponding to a power transmission medium, is applied.

Korean Patent Registration No. 10-0921178 (Registration Date: Oct. 5, 2009) discloses a power transmission device for bicycles. The power transmission device disclosed in this Patent is developed such that a radius of rotation of a pedal arm of a bicycle is reduced so as to acquire the same rotational power with less force.

However, in this Patent, because, in order to acquire the above effect, a separate rotating drum 310 configured to support a ring gear 311 is provided, a plurality of planetary gears 323 and 324 is fixedly disposed between disc-type installation plates 321 and 322, and a separate sprocket wheel having one side surface on which a driven gear 332 is disposed is provided, the power transmission structure of the power transmission device is relatively complicated and power transmission effects are deteriorated due to friction between the components of the power transmission device. Further, the change structure of a gear ratio is complicated and it is difficult to achieve change to a desired gear ratio.

DISCLOSURE

Technical Problem

Therefore, the present invention has been made in view of the above problems, and it is an object of the present invention to provide a crank variable-speed gear device which has excellent gear ratio increase and change effects and a simple power transmission structure, is conveniently manipulated, and provides a compact and lightweight bicycle.

Technical Solution

In accordance with the present invention, the above and other objects can be accomplished by the provision of, a crank variable-speed gear device for bicycles, which includes a crank shaft rotatably supported by a shaft housing in a shell provided on a frame structure of a bicycle, and a pair of crank arms provided at both ends of the crank shaft symmetrically to each other such that phases thereof are opposite each other and disc-type inner end parts thereof are fixedly mounted at the crank shaft, the crank variable-speed gear device including:

(a) a housing mounted on the crank shaft, and having a central opening formed therein, a recess formed in a radial inner surface of a first side of the housing, and a chain ring mounting part provided at a second side of the housing so as to protrude from the other side of the housing by a designated length;

(b) a gear assembly disposed in the housing and in the recess, and including a sun gear mounted on a radial outer surface of the shaft housing in the housing, planetary gears disposed so as to revolve about the sun gear while being engaged with the sun gear through one side of a radial outer surface of each thereof, and a ring gear disposed outside the planetary gears so as to be engaged with a remaining side of the radial outer surface of each of the planetary gears and provided with a second gear toothed part formed on a radial inner surface of the ring gear; and (c) a latch assembly disposed in the housing and on the second side of the housing so as to be coupled thereto, and including a latch body having a plurality of latch sites formed on a radial inner surface thereof, a plurality of first latches respectively disposed on the latch sites, a latch ring disposed so as to be inserted into the latch body and having a second latch engaging portion formed on a radial inner surface thereof, second latches disposed in the second latch insertion recesses formed on a radial outer surface of the sun gear such that upper end parts of the second latches are engaged with the second latch engaging portion, a latch guide disposed in the latch body, a lock ring mounted on a radial outer surface of the latch body, and a ring-shaped fastening bracket fixedly mounted on one side surface of the latch body.

Splines and spline grooves may be formed at both ends of the crank shaft, anti-rotation units having spline grooves and splines respectively engaged with the splines and the spline grooves may be provided in the inner end parts of the crank arms, and a plurality of planetary gear rotating shafts may protrude to a designated length in one lateral direction from one surface of the inner end part of the first crank arm out of the crank arms at positions located radially outside a first anti-rotation unit out of the anti-rotation units.

The sun gear may include a sun gear body having a cylindrical shape, when the sun gear is mounted on the radial outer surface of the shaft housing, a first side of the sun gear may be located close to the first anti-rotation unit and a second side of the sun gear may be located relatively distant from the first anti-rotation unit, a first gear toothed part may be formed on the radial outer surface of the sun gear at a position of the sun gear near the first side thereof, a first bearing may be disposed on the radial outer surface of the sun gear at a position between a free end of the first side of the sun gear and the first gear toothed part, and a first latch engaging portion may be formed on the radial outer surface of the second side of the sun gear.

The first latches may be elastically supported by first latch springs disposed adjacent to inner end parts of the first latches on a radial inner surface of the housing, a spring insertion groove may be formed on a radial outer surface of the sun gear body at a position between the first gear toothed part and the first latch engaging portion, a plurality of second latch insertion recesses may be formed at intermediate positions of the spring insertion groove, the second latches may be respectively disposed in the second latch insertion recesses, second latch springs configured to elastically support lower parts of the second latches may be disposed in the spring insertion groove, and a second bearing may be disposed on the radial outer surface of the sun gear body at a position near the second latch insertion recesses.

The latch guide may include a ring-shaped latch guide flange and latch guide extensions extending from one side surface of the latch guide flange by a designated length in a lateral direction, the latch guide extensions may be placed at positions adjacent to the first latches so as to come into contact with the first latches and thus to control operation of the first latches, when the latch ring and the latch guide are disposed in the latch body, the latch ring may be disposed to be inserted into the latch guide extensions of the latch guide, and a latch control lever may be formed so as to protrude radially outwards from one side of an outer circumferential portion of the latch guide flange by a designated length.

The latch body may include a ring-shaped latch flange and a ring-shaped latch extension configured to extend from one side of the latch flange by a designated length in a lateral direction, when the latch assembly is assembled, the latch control lever may be located in a guide recess formed in a middle of the latch flange by removing a part of the latch flange, and an outer end part of the latch control lever may be mechanically connected to a shift lever installed at a handlebar of the bicycle via a separate wire.

First and second chain rings having different diameters may be mounted on a radial outer surface of the chain ring mounting part, and a third chain ring having a different diameter from those of the first and second chain rings may be mounted on a radial outer surface of the lock ring.

Advantageous Effects

As described above, the crank variable-speed gear device according to the present invention may increase a gear ratio to 1.6:1 to 1.8:1 through a gear assembly and a latch assembly based on power transmitted by pedals of a front wheel of a bicycle and also change the gear ratio to 1:1, if necessary, thereby being capable of achieving excellent transmission efficiency, convenience in manipulation of the crank variable-speed gear device and reduction in size thereof, thus being capable of providing a compact and lightweight bicycle.

MODE FOR INVENTION

The drawings and the detailed description of the present invention relate to the embodiments of the present invention. Advantages and features of a device and methods for achieving the same disclosed in the present invention will become apparent to the those skilled in the art from the descriptions of aspects herein below with reference to the accompanying drawings.

Hereinafter, a crank variable-speed gear device for bicycles for increasing rotational power according to one exemplary embodiment of the present invention will be described in detail with reference to the accompanying drawings.

Figure 1:
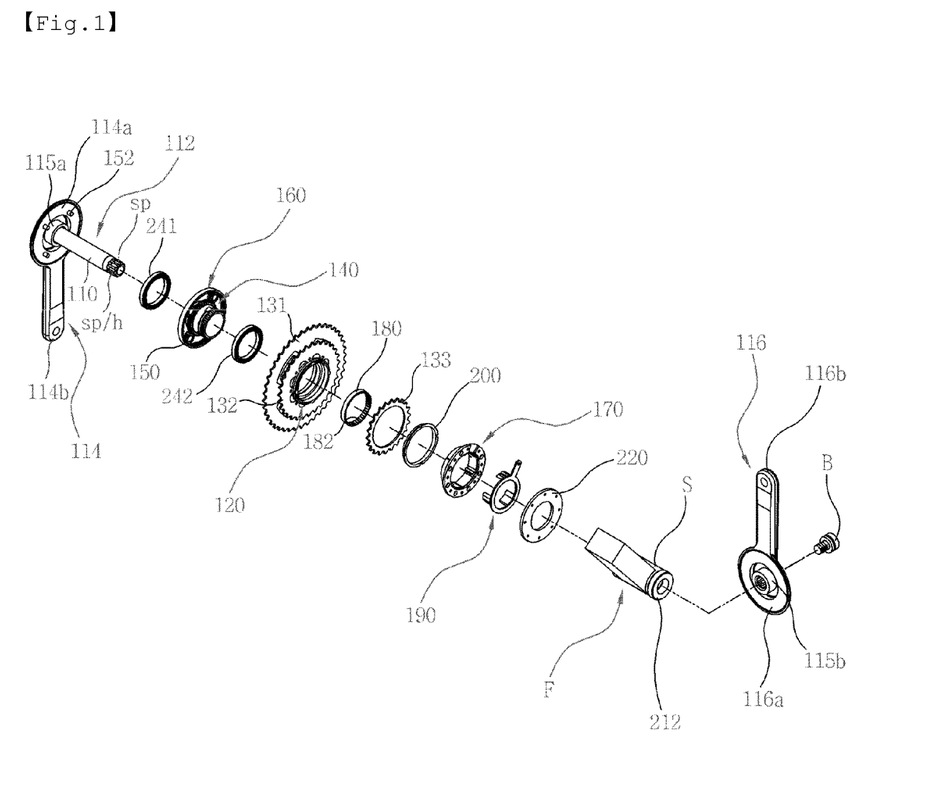
FIG. 1 is an exploded perspective view of a crank variable-speed gear device for increasing rotational power according to one exemplary embodiment of the present invention.
Figure 4:
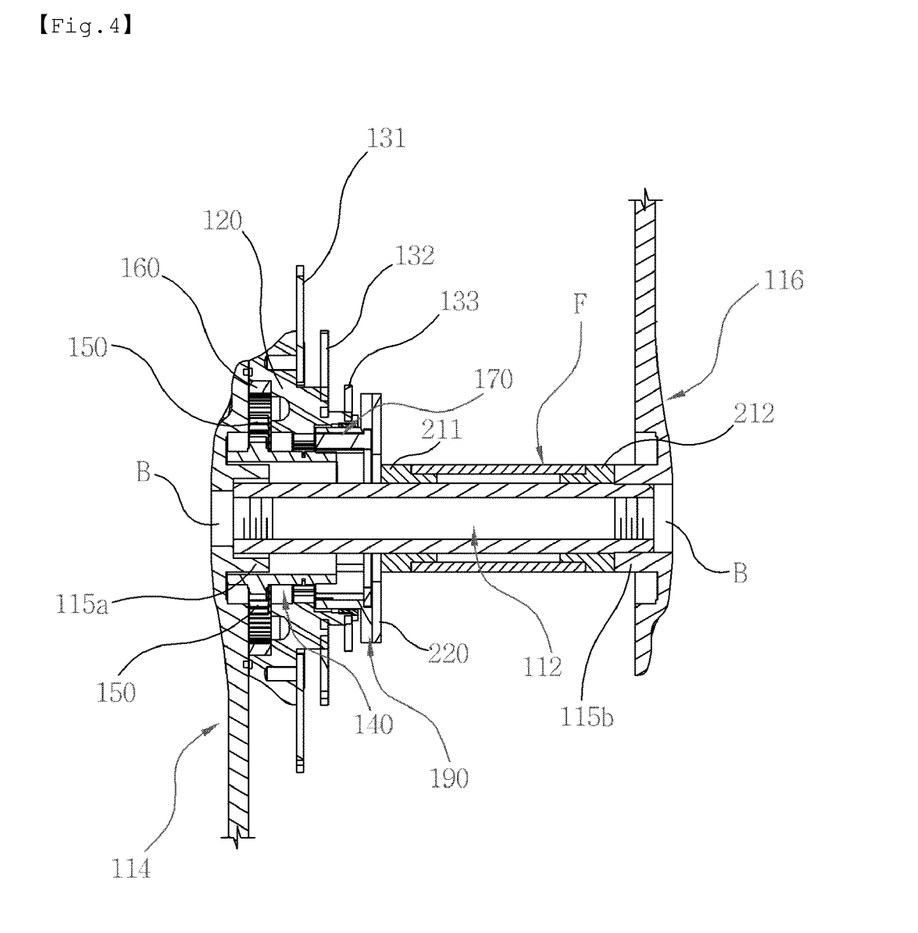
FIG. 4 is a longitudinal-sectional view illustrating the assembled state of the crank variable-speed gear device shown in FIG. 1.

First, FIG. 1 illustrates the overall structure of the crank variable-speed gear device for increasing rotational power according to one exemplary embodiment of the present invention, and FIG. 4 is a longitudinal-sectional view illustrating the assembled state of the crank variable-speed gear device shown in FIG. 1.

Referring to FIGS. 1 and 4, a crank variable-speed gear device 100 for bicycles for increasing rotational power includes a crank shaft 112 rotatably supported by a shaft housing 110 in a shell S provided on a frame structure F of a bicycle, and a pair of crank arms 114 and 116 provided at both ends of the crank shaft 112 symmetrically to each other such that phases thereof are opposite each other and disc-type inner end parts 114a and 116a thereof are fixedly mounted at the crank shaft 112. Pedals (not shown) are installed at outer end parts 114b and 116b, corresponding to free ends of the crank arms 114 and 116, so as to be freely rotatable about respective pedal shafts, as in general bicycles.

Splines sp and spline grooves sp/h are formed at both ends of the crank shaft 112 so as to fixedly mount the crank arms 114 and 116 on the crank shaft 112, and anti-rotation units 115a and 115b having spline grooves (not shown) and splines (not shown), which are respectively engaged with the splines sp and the spline grooves sp/h, are provided in the inner end parts 114a and 116b, thereby forming structures which prevent the crank shaft 112 and the inner end parts 114a and 116b from being rotated about each other. Based on the coupling structures between the splines sp and the spline grooves sp/h of the crank shaft 112 and the corresponding anti-rotation units 115a and 115b of the crank arms 114 and 116, the state in which the crank arms 114 and 116 are coupled to both ends of the crank shaft 112 may be stably maintained by fastening bolts B inserted into the crank shaft 112 through the crank arms 114 and 116.

One side of a second rotating connection piece 212 provided with a bearing installed therein is mounted on one exposed side surface of the second anti-rotation unit 115b protruding from the second inner end part 116a of the second crank arm 116 to a designated length in one lateral direction so as to come in rolling contact with the exposed side surface of the second anti-rotation unit 115b, and the other side of the second rotating connection piece 212 is inserted into one side of the shell S of the frame structure F. Correspondingly, one side of a first rotating connection piece 211 is inserted into the other side of the shell S of the frame structure F, and the other exposed side of the first rotating connection piece 211 comes in rolling contact with one side of a fastening bracket 220 of a latch assembly, which will be described below.

Further, a plurality of planetary gear rotating shafts 152 protrude to a designated length in one lateral direction from the first inner end part 114a of the first crank arm 114 at positions located radially outside the first anti-rotation unit 115a. The planetary gear rotating shafts 152 are disposed concentrically from the center of the crank shaft 112. Planetary gears 150 provided with through holes formed through the centers thereof are inserted into the respective planetary gear rotating shafts 152.

Figure 2:
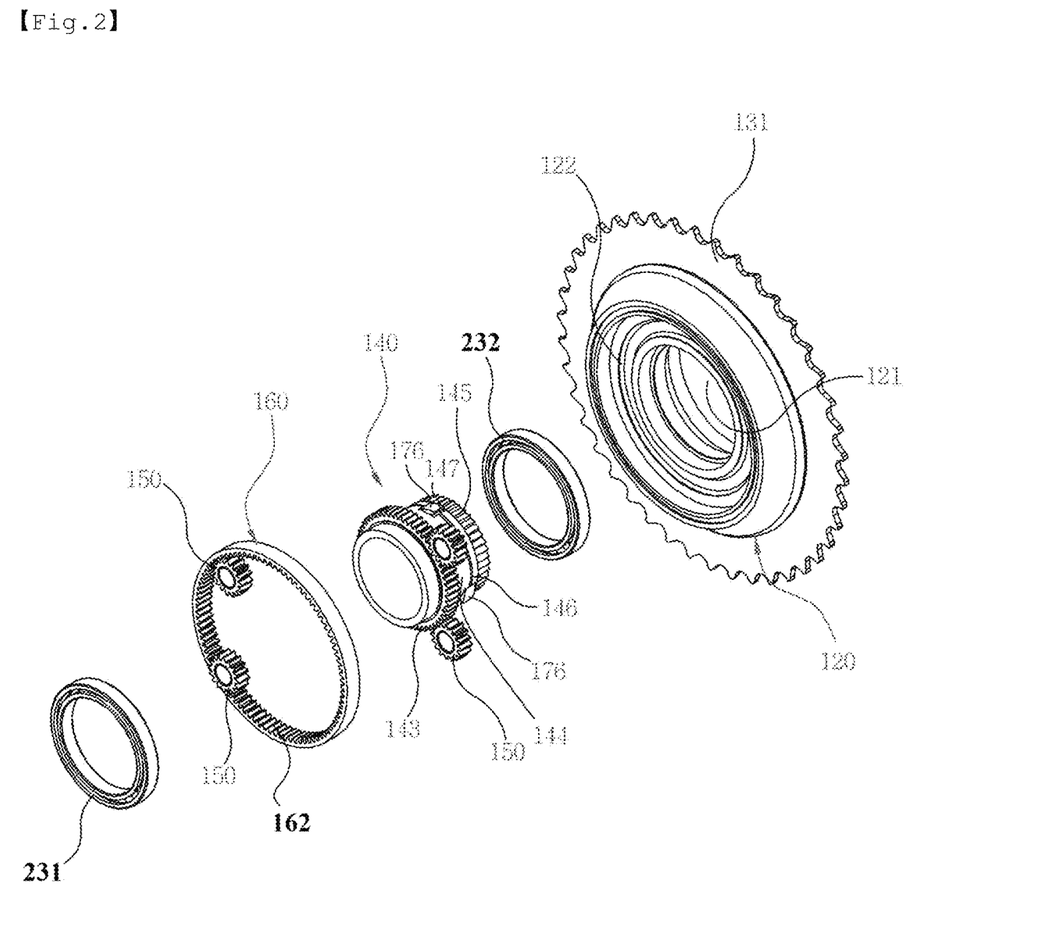
FIG. 2 is an exploded perspective view illustrating a housing and a gear assembly coupled to one side of the housing shown in FIG. 1.

FIG. 2 illustrates a housing 120 mounted on the crank shaft 112, and a gear assembly (the reference numeral thereof being omitted) coupled to one side of the housing 120.

Referring to FIGS. 1 and 2, the gear assembly is disposed in and at one side of the housing 120 having a central opening 121 formed therein, and in more detail, a sun gear 140 is disposed in the central opening 121, and a plurality of planetary gears 150 and a ring gear 160 are disposed in a recess 122 having a staircase multistage structure formed at one side of the housing 120.

The sun gear 140 is mounted on the radial outer surface of the shaft housing 110 of the crank shaft 112 in the housing 120. The sun gear 140 includes a sun gear body 144 having a cylindrical shape and, when the sun gear 140 is mounted on the radial outer surface of the shaft housing 110 of the crank shaft 112, a first side of the sun gear 140 is located close to the first anti-rotation unit 115a of the first crank arm 114 and a second side of the sun gear 140 is located relatively distant from the first anti-rotation unit 115a of the first crank arm 114.

A first gear toothed part 143 is formed on the radial outer surface of the sun gear 140 at a position of the sun gear 140 near the first side thereof. The planetary gears 150 are disposed on the first gear toothed part 143 so as to revolve about the sun gear 140 such that one side of the radial outer surface of each of the planetary gears 150 is engaged with the first gear toothed part 143. The other side of the radial outer surface of each of the planetary gears 150 is engaged with a second gear toothed part 162 formed on the radial inner surface of the ring gear 160 disposed outside the planetary gears 150. A first bearing 231 is disposed on the radial outer surface of the sun gear 140 at a position between a free end of the sun gear 140 and the first gear toothed part 143.

A first latch engaging portion 145 having screw threads inclined in one direction is formed on the radial outer surface of the second side of the sun gear 140. A plurality of first latches 118 (with reference to FIG. 3) is disposed radially outside the first latch engaging portion 145, the first latches 118 are elastically supported by first latch springs 119 (with reference to FIG. 3) disposed adjacent to the inner end parts of the first latches 118 on the radially inner surface of the housing 120, and the outer end parts of the first latches 118 are engaged with the first latch engaging portion 145 or contact the tip of the first latch engaging portion 145 as if the outer end parts of the first latches 118 were grazing the tip of the main latch engaging portion 145.

A spring insertion groove 146 is formed on the radial outer surface of the sun gear body 144 at a position between the first gear toothed part 143 and the first latch engaging portion 145, and a plurality of second latch insertion recesses 147 is formed at the intermediate positions of the spring insertion groove 146. Second latches 176 (with reference to FIG. 5) are respectively disposed in the second latch insertion recesses 147. Second latch springs (not shown) configured to elastically support the lower parts of the second latches 176 are disposed in the spring insertion groove 146. A second bearing 232 is disposed on the radial outer surface of the sun gear body 144 140 at a position near the second latch insertion recesses 147.

The above-described sun gear 140, planetary gears 150 and ring gear 160 form a gear assembly for increasing the rotational power of the crank arms 114 and 116 applied by a bicycle rider by a designated rate.

Figure 3:
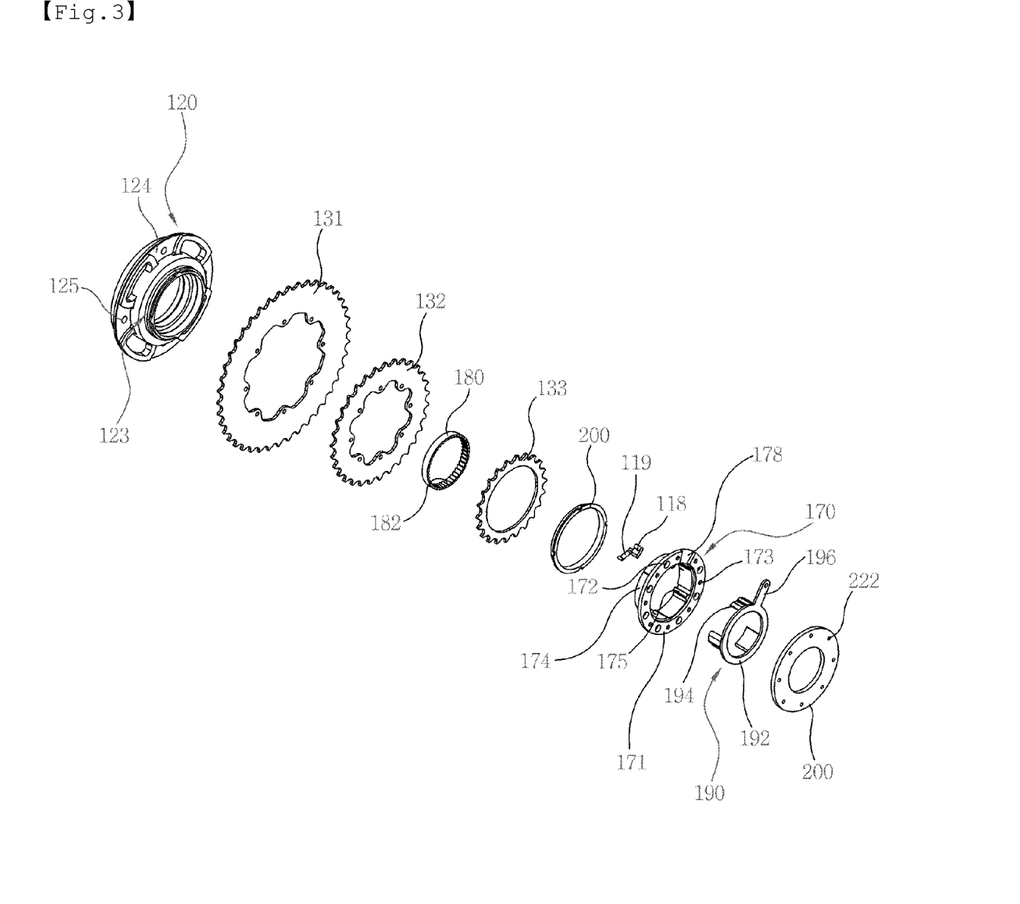
FIG. 3 is an exploded perspective view illustrating the housing and a latch assembly coupled to the other side of the housing shown in FIG. 1.

FIG. 3 illustrates the housing 120 mounted on the crank shaft 112, and a latch assembly (the reference numeral thereof being omitted) coupled to the other side of the housing 120.

Referring to FIGS. 1 and 3, a chain ring mounting part 123 is provided at the other side of the housing 120, and the chain ring mounting part 123 protrudes from the other side of the housing 120 by a designated length so as to be formed in a staircase multistage structure. A cog carrier (not shown) is mounted on the radial outer surface of the chain ring mounting part 123, a plurality of chain rings 131 and 132 having different diameters (with reference to FIG. 4) is disposed thereon, and a spacer (not shown) is disposed therebetween. Preferably, first and second chain rings 131 and 132 having different diameters are mounted on the radial outer surface of the chain ring mounting part 123. The chain rings 131 and 132 are disposed so as to be integrated with the chain ring mounting part 123, and are configured to change speed through selective engagement of a chain (not shown) connected to a transmission chain gear (not shown) in response to gear shift. A housing flange 124 having an approximately ring shape protrudes radially outwards from a position of the housing 120 between the recess 122 and the chain ring mounting part 123. A plurality of first fastening holes 125 is formed through the housing flange 124.

In the state in which the gear assembly is mounted in the recess 122 provided at one side of the housing 12 and in the central opening 121 thereof, as described above, a latch body 170 is mounted on the radial inner surface of the sun gear body 144. The latch body 170 includes a ring-shaped latch flange 171 and a ring-shaped latch extension 174 extending from one side of the latch flange 171 by a designated length in a lateral direction. A plurality of second fastening holes 172 is formed through the latch flange 171 by the same interval in the circumferential direction of the latch flange 171. Third fastening holes 173 are formed through the latch flange 171 between the second fastening holes 172. When the latch body 170 is mounted on the radial outer surface of the sun gear body 144 so that the latch extension 174 is inserted into the central opening 121 of the housing 120, one surface of the latch flange 171 comes into close contact with one surface of the housing flange 124, and the latch body 170 is fixed to the other side of the housing 120 by inserting separate fastening bolts (not shown) and nuts (not shown) into the first fastening holes 125 of the housing flange 124 and the second fastening holes 172 of the latch flange 171 in this state.

A plurality of latch sites 175, each of which includes a pair of a valley and a ridge, are formed on the radial inner surface of the latch extension 174. A pair of the first latch 118 and the first latch spring 119, configured to elastically support the first latch 118, is disposed on each of the latch sites 175.

A latch ring 180 and a latch guide 190 are disposed in the latch body 170 configured in this manner. A second latch engaging portion 182 having screw threads inclined in one direction is formed on the radial inner surface of the latch ring 180. Protruding upper parts of the above-described second latches 176 are engaged with the second latch engaging portion 182 (with reference to FIG. 5).

The latch guide 190 includes a ring-shaped latch guide flange 192 and latch guide extensions 194 extending from one side surface of the latch guide flange 192 by a designated length in a lateral direction. The latch guide extensions 194 are placed at positions adjacent to the first latches 118 so as to come into contact with the first latches 118 located on the latch sites 175 of the latch body 170, as needed, and thus to control the operation of the first latches 118.

When the latch ring 180 and the latch guide 190 are disposed in the latch body 170, the latch ring 180 is disposed so as to be inserted into the latch guide extensions 194 of the latch guide 190. A latch control lever 196 is formed so as to protrude radially outwards from one side of the outer circumferential portion of the latch guide flange 192 by a designated length. When the latch assembly is assembled, the latch control lever 196 of the latch guide 190 is located in a guide recess 178 formed in the middle of the latch flange 171 by removing a part of the latch flange 171 of the latch body 170. The outer end part of the latch control lever 196 is mechanically connected to a shift lever (not shown) installed at a handlebar of the bicycle via a separate wire (not shown).

When the shift lever (not shown) is operated in order to change the speed of the bicycle, the latch control lever 196 of the latch guide 190 moves leftwards and rightwards in the guide recess 178 of the latch body 170 and, when the latch guide 190 is rotated leftwards and rightwards due to such movement, the latch guide extensions 194 come into contact with the first latches 118 and change the posture of the first latches 118 and, thus, the first latches 118 are engaged with or disengaged from the main latch engaging portion 145 of the sun gear 140.

Further, the first latches 118 may be disposed such that the inner end parts thereof are elastically fixed onto the radial inner surface of the latch body 170 by the first latch springs 119 and the outer end parts thereof are engaged with the main latch engaging portion 145 or contact the tip of the main latch engaging portion 145 as if the outer end parts of the first latches 118 were grazing the tip of the main latch engaging portion 145. Here, the latch guide extensions 194 serve to guide the engaging operation and the disengaging operation of the first latches 118, as described above.

In the state in which the latch ring 180 and the latch guide 190 are disposed in the latch body 170, a lock ring 200 is mounted on the radial outer surface of the latch extension 174 of the latch body 170, and a third chain ring 133 is mounted on the radial outer surface of the lock ring 200. A ring-shaped fastening bracket 220 is fixedly mounted on the exposed surface of the latch flange 171 of the latch body 170. A plurality of fourth fastening holes 222 is formed through the fastening bracket 220. The fastening bracket 220 is fixed to the exposed surface of the latch flange 171 by separate fastening bolts (not shown) and nuts (not shown) passing through the fourth fastening holes 222 of the fastening bracket 220 and the third fastening holes 173 formed through the latch flange 171 of the latch body 170.

Hereinafter, a process of operating the crank variable-speed gear device 100 for bicycles having the above-described configuration in accordance with one exemplary embodiment of the present invention will be described in brief.

Figure 6:
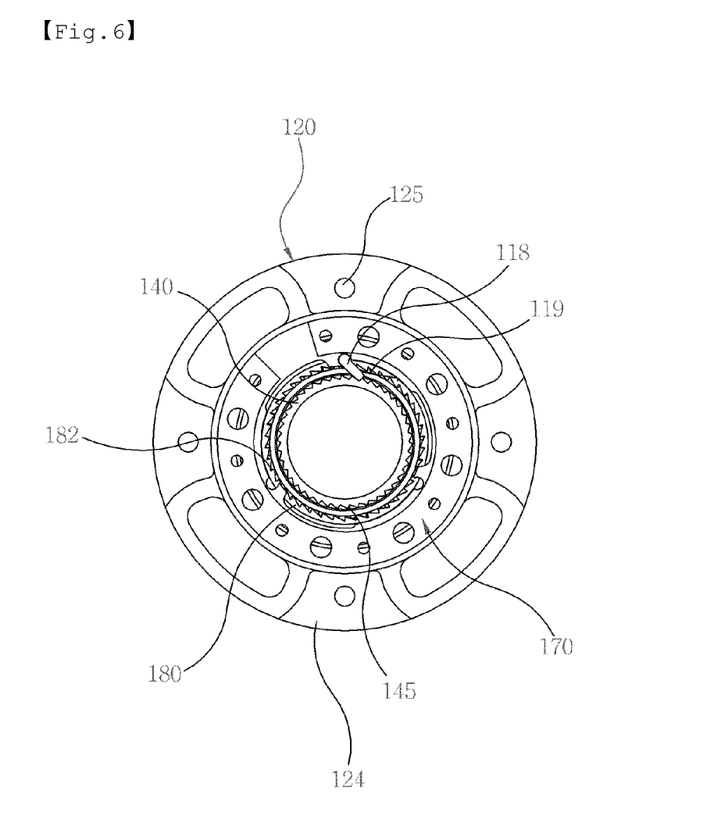
FIGS. 6 and 7 are cross-sectional views illustrating the operating state of the crank variable-speed gear device shown in FIG. 1 and, in more detail, illustrating the operating state of first latches.
Figure 7:
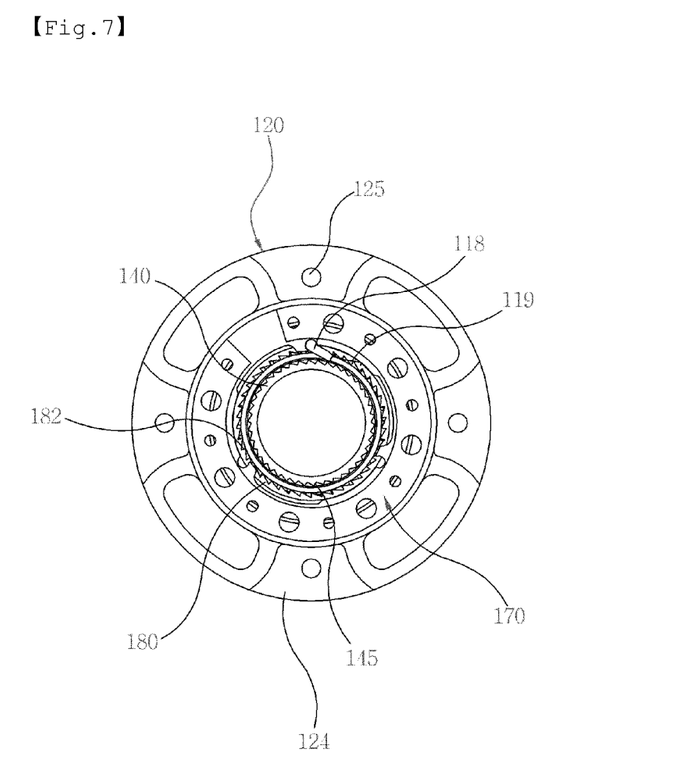

FIGS. 6 and 7 are cross-sectional views illustrating the operating state of the crank variable-speed gear device 100 shown in FIG. 1 and, in more detail, illustrating the operating state of the first latches 118.

First, referring to FIGS. 1 and 6, when a bicycle rider operates the shift lever (not shown) so as to increase a gear ratio to 1.6:1 to 1.8:1 using the crank variable-speed gear device 100 and then rotates the pedals (not shown) of the bicycle in a forward direction, the latch control lever 196 of the latch guide 190 moves leftwards and rightwards in the guide recess 178 of the latch body 170 and, when the latch guide 190 is rotated leftwards and rightwards due to such movement, the latch guide extensions 194 come into contact with the first latches 118 and change the posture of the first latches 118 and, thus, the outer end parts of the first latches 118 protrude towards the sun gear 140 in the radially inward direction so as to be firmly engaged with the first latch engaging portion 145.

Then, in the state in which the sun gear 140 is fixed to the crank shaft 112, the planetary gears 150 engaged with the first gear toothed part 143 of the sun gear 140 revolve about the sun gear 140 along the first gear toothed part 143, and the ring gear 160 engaged with the planetary gears 150 is rotated.

Figure 5:
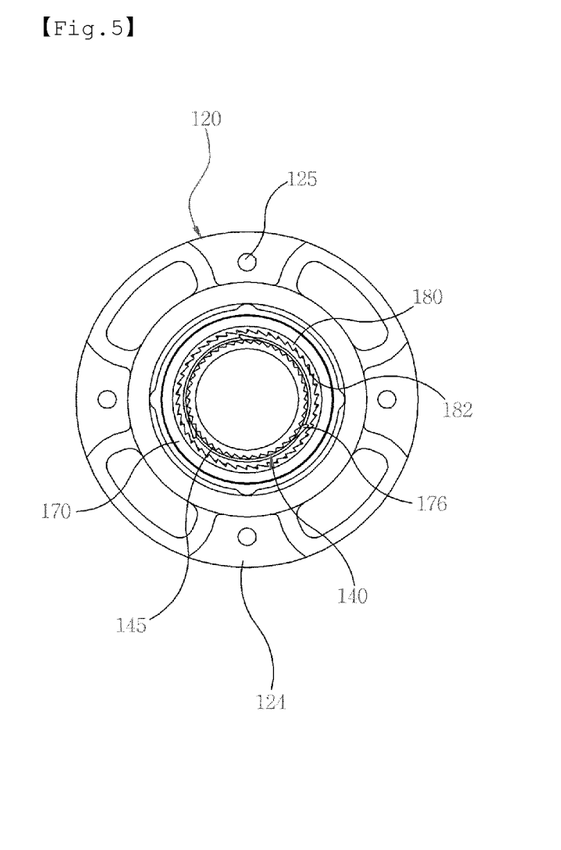
FIG. 5 is a cross-sectional view illustrating the operating state of the crank variable-speed gear device shown in FIG. 1 and, in more detail, illustrating the operating state of second latches.

FIG. 5 illustrates the operating state of the crank variable-speed gear device 100 and, in more detail, illustrates the operating state of the second latches 176.

As described above, when the first latches 118 are operated, as shown in FIG. 5, the second latches 176 disposed on the radial outer surface of the sun gear body 144 of the sun gear 140 are engaged with the second latch engaging portion 182 formed on the radial inner surface of the latch ring 180 so as not to be released concentrically outwards, in the state in which the second latches 176 are elastically supported by the second latch springs (not shown), and thus, the bicycle smoothly travels.

Consequently, the acceleration effect, in which the gear ratio is increased to 1.6:1 to 1.8:1 by the gear assembly including the sun gear 140, the planetary gears 150 and the ring gear 160, is transmitted to the rear wheel of the bicycle via the bicycle chain (not shown) disposed on the chain rings 131, 132 and 133 of the housing 120.

In contrast, referring to FIGS. 1 and 7, when the bicycle rider operates the shift lever (not shown) so as to change the gear ratio to 1:1 using the crank variable-speed gear device 100 and then rotates the pedals (not shown) of the bicycle in the forward direction, the latch control lever 196 of the latch guide 190 moves leftwards and rightwards in the guide recess 178 of the latch body 170 and, when the latch guide 190 is rotated leftwards and rightwards due to such movement, the latch guide extensions 194 come into contact with the first latches 118 and change the posture of the first latches 118 and, thus, the outer end parts of the first latches 118 are disengaged from the first latch engaging portion 145 of the sun gear 140, and thereby, the sun gear 140 is rotated in one direction in the state in which the first latches 118 contact the tip of the first latch engaging portion 145 as if the first latches 118 were grazing the tip of the first latch engaging portion 145.

As described above referring to FIG. 5, because the second latches 176 disposed on the radial outer surface of the sun gear body 144 are engaged with the second latch engaging portion 182 formed on the radial inner surface of the latch ring 180 in the state in which the second latches 176 are elastically supported by the second latch springs (not shown), the sun gear 140 rotates together with the ring gear 160 at a ratio of 1:1 while pushing the planetary gears 150 in the rotation direction of the sun gear 140.

Although exemplary embodiments of the present invention have been disclosed for illustrative purposes, those skilled in the art will appreciate that various modifications, additions and substitutions are possible, without departing from the scope and spirit of the invention as disclosed in the accompanying claims. Therefore, the present disclosure as described above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

The invention claimed is:

1. A crank variable-speed gear device (100) for bicycles, which comprises a crank shaft (112) rotatably supported by a shaft housing (110) in a shell(S) provided on a frame structure (F) of a bicycle, and a pair of crank arms (114, 116) provided at both ends of the crank shaft (112) symmetrically to each other such that phases thereof are opposite each other and inner end parts (114a, 116a) thereof are fixedly mounted at the crank shaft (112), the crank variable-speed gear device comprising:

(a) a housing (120) mounted on the crank shaft (112), and having a central opening (121) formed therein, a recess (122) formed in a radial inner surface of a first side of the housing (120), and a chain ring mounting part (123) provided at a second side of the housing (120) so as to protrude from the second side of the housing (120) by a designated length;

(b) a gear assembly disposed in the housing (120) and in the recess (122), and comprising a sun gear (140) mounted on a radial outer surface of the shaft housing (110) in the housing (120), planetary gears (150) disposed so as to revolve about the sun gear (140) while being engaged with the sun gear (140) through one side of a radial outer surface of each thereof, and a ring gear (160) disposed outside the planetary gears (150) so as to be engaged with a remaining side of the radial outer surface of each of the planetary gears (150) and provided with a second gear toothed part (162) formed on a radial inner surface of the ring gear (160); and (c) a latch assembly disposed in the housing (120) and on the second side of the housing (120) so as to be coupled thereto, and comprising a latch body (170) having a plurality of latch sites (175) formed on a radial inner surface thereof, a plurality of first latches (118) respectively disposed on the latch sites (175), a latch ring (180) disposed so as to be inserted into the latch body (170) and having a second latch engaging portion (182) formed on a radial inner surface thereof, second latches (176) disposed in second latch insertion recesses (147) formed on a radial outer surface of the sun gear (140) such that upper end parts of the second latches (176) are engaged with the second latch engaging portion (182), a latch guide (190) disposed in the latch body (170), a lock ring (200) mounted on a radial outer surface of the latch body (170), and a ring-shaped fastening bracket (220) fixedly mounted on one side surface of the latch body (170), wherein splines (sp) and spline grooves (sp/h) are formed at both ends of the crank shaft (112), anti-rotation units (115a, 115b) having spline grooves and splines respectively engaged with the splines (sp) and the spline grooves (sp/h) are provided in the inner end parts (114a, 116b) of the crank arms (114, 116), and a plurality of planetary gear rotating shafts (152) protrudes to a designated length in one lateral direction from one surface of the inner end part of the first crank arm (114) out of the crank arms (114, 116) at positions located radially outside a first anti-rotation unit (115a) out of the anti-rotation units (115a, 115b), wherein the sun gear (140) comprises a sun gear body (144) having a cylindrical shape, when the sun gear (140) is mounted on the radial outer surface of the shaft housing (110), a first side of the sun gear (140) is located closer to the first anti-rotation unit (115a) than a second side of the sun gear (140), a first gear toothed part (143) is formed on the radial outer surface of the sun gear (140) at a position of the sun gear (140) near the first side thereof, a first bearing (231) is disposed on the radial outer surface of the sun gear (140) at a position between a free end of the first side of the sun gear (140) and the first gear toothed part (143), and a first latch engaging portion (145) is formed on the radial outer surface of the second side of the sun gear (140), wherein the first latches (118) are elastically supported by first latch springs (119) disposed adjacent to inner end parts of the first latches (118) on a radial inner surface of the housing (120), a spring insertion groove (146) is formed on a radial outer surface of the sun gear body (144) at a position between the first gear toothed part (143) and the first latch engaging portion (145), the second latch insertion recesses (147) is formed at intermediate positions of the spring insertion groove (146), the second latches (176) are respectively disposed in the second latch insertion recesses (147), second latch springs configured to elastically support lower parts of the second latches (176) are disposed in the spring insertion groove (146), and a second bearing (232) is disposed on the radial outer surface of the sun gear body (144) at a position near the second latch insertion recesses (147).

2. The crank variable-speed gear device for bicycles according to claim 1, wherein the latch guide (190) comprises a ring-shaped latch guide flange (192) and latch guide extensions (194) extending from one side surface of the latch guide flange (192) by a designated length in a lateral direction, the latch guide extensions (194) are placed at positions adjacent to the first latches (118) so as to come into contact with the first latches (118) and thus to control operation of the first latches (118), when the latch ring (180) and the latch guide (190) are disposed in the latch body (170), the latch ring (180) is disposed to be inserted into the latch guide extensions (194) of the latch guide (190), and a latch control lever (196) is formed so as to protrude radially outwards from one side of an outer circumferential portion of the latch guide flange (192) by a designated length.

3. The crank variable-speed gear device for bicycles according to claim 2, wherein the latch body (170) comprises a ring-shaped latch flange (171) and a ring-shaped latch extension (174) configured to extend from one side of the latch flange (171) by a designated length in a lateral direction, when the latch assembly is assembled, the latch control lever (196) is located in a guide recess (178) formed in a middle of the latch flange (171) by removing a part of the latch flange (171), and an outer end part of the latch control lever (196) is mechanically connected to a shift lever installed at a handlebar of the bicycle via a separate wire.

4. The crank variable-speed gear device for bicycles according to claim 1, wherein first and second chain rings (131, 132) having different diameters are mounted on a radial outer surface of the chain ring mounting part (123), and a third chain ring (133) having a different diameter from those of the first and second chain rings (131, 132) is mounted on a radial outer surface of the lock ring (200).

\* \* \* \* \*